United States Patent [19]
Veltman

[11] Patent Number: 5,396,497
[45] Date of Patent: Mar. 7, 1995

[54] SYNCHRONIZATION OF AUDIO/VIDEO INFORMATION

[75] Inventor: Markus H. Veltman, Tokyo, Japan

[73] Assignee: Sony Corporation, Japan

[21] Appl. No.: 32,341

[22] Filed: Mar. 16, 1993

[30] Foreign Application Priority Data

Feb. 26, 1993 [JP] Japan .................. 5-063293

[51] Int. Cl.⁶ .................. H04J 3/06; H04N 5/04
[52] U.S. Cl. .................. 370/100.1; 370/112; 375/362; 375/376; 348/423; 348/465
[58] Field of Search .................. 370/60, 60.1, 77, 94.1, 370/94.2, 94.3, 100.1, 105.1, 105.4, 110.1, 112; 375/106, 107, 110, 111, 114, 118, 119, 120; 358/12, 14, 15, 141, 142, 143, 146, 148, 149, 198; 348/423, 465

[56] References Cited

U.S. PATENT DOCUMENTS

| | | | |
|---|---|---|---|
| Re. 33,535 | 2/1991 | Cooper | 358/149 |
| 4,851,909 | 7/1989 | Noske et al. | 358/143 |
| 4,852,084 | 7/1989 | Verbiest et al. | 370/94.1 |
| 5,260,978 | 11/1993 | Fleischer et al. | 375/106 |
| 5,267,036 | 11/1993 | Habraken et al. | 358/141 |

*Primary Examiner*—Douglas W. Olms
*Assistant Examiner*—Hassan Kizou
*Attorney, Agent, or Firm*—Jerry A. Miller, Limbach & Limbach, Ian Hardcastle

[57] ABSTRACT

A compressed video signal and a compressed audio signal decoding apparatus which including a local access unit counter intended for digital AV applications where access unit headers (e.g. frame headers, audio unit headers or other kind of data unit headers) may be lost or generated by storage media or transmission errors. In order to prevent a resulting AV sync error a value called "access unit count" is included in each elementary stream. With this value each decoder can detect lost or false access unit headers, and correct the AV synchronization. In order to support editing, an extra bit can be added to indicate discontinuity in the access unit count.

32 Claims, 8 Drawing Sheets

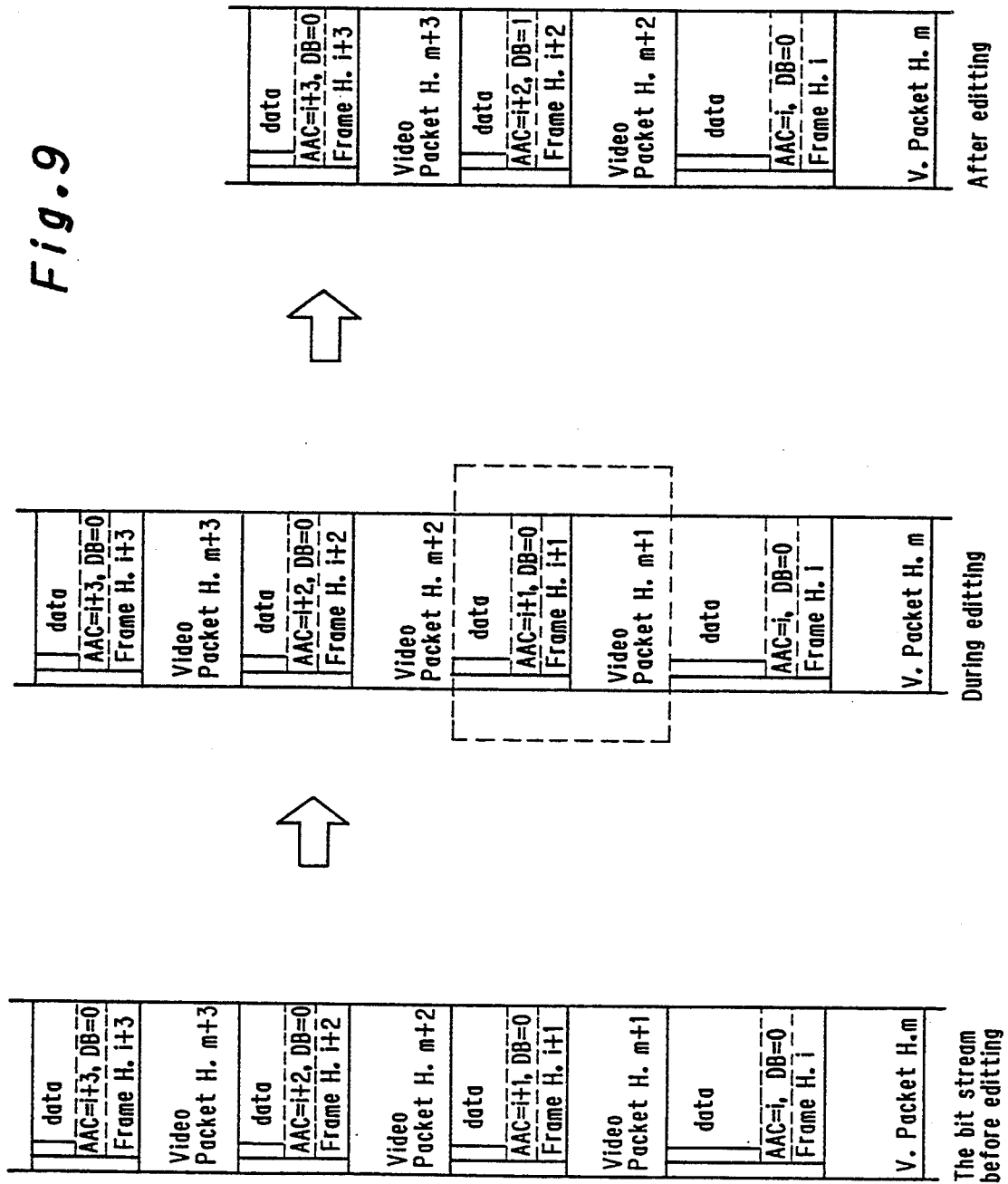

SYNCHRONIZATION OF AUDIO/VIDEO INFORMATION

BACKGROUND

1. Field of the Invention

This invention relates generally to the field of digital transmission or storage of audio and video information. More particularly, this invention relates to a technique for verifying the timing of multiplexed packetized audio and/or video (A/V) information such as ISO's (International Organization for Standardization) MPEG (Motion Pictures Expert Group).

2. Background of the Invention

The term "access unit" as used herein means either a frame of video data or a batch of audio samples or a batch of other data samples. In general, a decoder processes its "access units" and outputs decoded access units at regular intervals. In the case of video, for example, this interval is the picture rate, and for audio this is a constant integer (equal to the number of audio samples in an audio access unit) times the audio sampling rate.

In the case of an ISO standard MPEG system application, as defined for example in ISO document number 1-11172 which is hereby incorporated by reference, a "time stamp" indicating the decoding time for an access unit, is included in the multiplex syntax for multiplexed video and audio packets as shown in FIG. 1. These time stamps are included in the multiplex syntax, i.e. in packet headers. A time stamp indicates the decoding time of the first access unit header in that packet. Since each packet can include multiple access units, each access unit is not associated with a time stamp.

Although multiplex applications use multiple decoders, ISO's MPEG 1 system standard can also be applied in applications that only have one decoder. In a fixed bit rate (e.g. audio) application, perfect clocks do not exist, therefore the digital storage media (or transmission) bit rate and (depending on the sampling clock frequency error) the decoder input bit rate vary. In such a system, the decoder generally reads one access unit at a time. Furthermore, due to the differences in the clocks, the transfer bit rate and the decoder input bit rate do not identically match. A buffer can be used to compensate for these differences. In the case of video data, consecutive access units (i.e. frames) are compressed to provide variable length compressed (VLC) access units having a length that depends on the picture content. Consequently the video decoder input bit rate has large variations and a relatively large buffer is used.

However, even if a buffer is used, ideal bit rates generally do not exist and therefore "buffer errors" (and even buffer overflow or underflow) can occur. Two methods are generally used to prevent buffer overflow and underflow. With one method (called Digital Storage Media slave) the transfer rate (i.e. buffer input rate) is controlled. The other method (called decoder slave) is realized by controlling the buffer output data rate. In the case of video this can be done by adjusting the frame rate. In the case of audio, this is done by adjusting the sampling rate. The buffer output data rate is thus adjusted.. Another decoder slave method skips or repeats access units in order to control the buffer output data rate.

Adjustments of the decoder rate and adjustments of the transfer bit rate are restricted by characteristics of the peripheral hardware. Therefore if the buffer error (i.e. deviation from the ideal buffer fullness) is too large, the appropriate control can become difficult or impossible. When starting playback, a large buffer error can sometimes occur. Therefore generally the decoder starts decoding after an appropriate start up delay in order to reduce the initial buffer error.

In the MPEG 1 system standard, fields have been included in the multiplex syntax which can be used to control the decoder or the transfer rate. In the pack header a value called SCR (System Clock Reference) can be used to control the transfer data rate. Time stamps in the video packet header can be used to control the frame rate, and time stamps in the audio packet header can be used to control the sampling rate. SCR indicates the time when (the first part of the) packet data enters the decoder buffer and time stamps indicate when a certain access unit in the packet data is to be removed from the decoder buffer.

Both SCR and time stamps are absolute values of a clock that increments continuously at a rate of 90 KHz. Therefore the difference between the first read SCR and the first read time stamp can be used as a start up delay.

Unfortunately, (except for the first audio and video time stamps for initial start up) it is difficult to use consecutive time stamps. The problem is that, after demultiplexing, the time stamps are separated from their related access units. I.e., since the decoding system's demultiplex switch separates time stamps from the packet data and then stores the packet data (without their time stamps) in the respective buffers, it becomes difficult to keep track of which time stamp belongs to which access unit header. For example: a decoding system processes a certain MPEG multiplex stream. The first SCR (System Clock Reference) is detected, and the system uses this value to initialize a local (90 KHz) clock. From now on this clock increments automatically at a 90 KHz rate. Then the system detects the first video DTS. It indicates (with a 90 KHz clock value) the decoding time for the first following picture header. However generally there is a significant delay before this picture header should be decoded (due to the buffer before the video decoder), and therefore the time stamp must also be delayed or buffered before it can be used. Furthermore, before the first picture is decoded, several more video packets with time stamps can arrive at the demultiplexer switch and these time stamps should also be delayed or buffered somewhere before they can be used.

With the adopted definition for time stamps, it is a significant shortcoming of the MPEG standard that the time stamps were not included in the video and audio syntax specifications.

The problem is that the time stamps are in the "wrong" layer. This might not be so bad if all access unit headers had time stamps. However, this is not the case. Therefore, simply adding an additional time stamp buffer for each decoder and assuming that each access unit has an accompanied time stamp is not possible. Since a packet header contains only one time stamp, and since the packet data can contain several access unit headers, not every access unit header will have a time stamp. Even if the packet data contains an access unit header, inserting a time stamp in the preceding packet header is optional because the only MPEG requirement concerning time stamps is that they occur at least once every 0.7 seconds.

If a particular application uses two or more decoders (e.g. one video and one audio decoder) it is often necessary to synchronize these decoders. According to the MPEG 1 system standard time stamps must be used to perform this synchronization. The standard assumes that the audio and video decoder processing delays are 0 ms. Consequently (in this model) the time when an access unit is decoded is equal to the time when the decoded access unit (i.e. "presentation unit") is output.

Besides the previously mentioned reason for the decoder start-up delay (to minimize initial buffer error), in case of multi-decoder systems, for each decoder an initial start-up delay is also necessary. This is because, for example, the audio and video packets that occur together (in the same pack) are often segments of the audio and video signal that, after decoding, should be output at different times. This is possible, because MPEG has agreed on a certain amount of buffering before each video and audio decoder, which allows a flexible multiplex bitstream structure. A different way to describe the MPEG multiplex standard is: any kind of pack and packet structure is acceptable, as long as the buffers in the reference decoder do not overflow or underflow.

Two kinds of decoding systems exist for synchronization. The first is a locked system wherein the frame rate and sampling rate are locked to a single common clock (e.g. 90 KHz in MPEG). The locked system has the disadvantage that it can only play back bit streams that were generated by an encoding system where the frame rate and sampling rate were also locked to one common clock. Whether the video and audio encoder clocks are locked or not will depend on the application. (In case of CDI-FMV, locking the encoders is mandatory). In this system, (if the transmission error characteristics are limited) after reading the first video and audio time stamps and using them for the respective decoder start, all following time stamps can be ignored. This kind of decoding system is relatively simple, and does not need to keep track of which time stamps belong to which access units. However, if a transmission error causes missing or false access unit headers, a sync error results (and a corresponding buffer error). Such problems can also occur in non-MPEG systems. The invention provides a solution for this problem.

The second kind of decoding system (called non-locked decoding system) can also play back non-locked encoded multiplex bit streams. Non-locked encoded bit streams are generated by encoding systems that have independent encoder frame and sampling rate clocks. In this case there is no relation between the video encoder's frame rate error and the audio encoder's sampling rate error; they vary independently.

Non-locked MPEG decoding systems are used if the multiplex bitstream was generated by a non-locked encoding system, i.e. an encoding system where the picture rate clock and audio sampling rate clock are independent. Whether the non-locked encoded systems will be used or not will depend on the application. For example, in case of CDI-FMV (i.e., Phillips' Compact Disc Interactive with Full Motion Video extension, which has adopted the MPEG 1 standard), independent video and audio encoder clocks are not allowed. Instead, both these clocks must be locked to a single common clock. However, in the future some applications may use non-locked MPEG systems for certain applications.

When the MPEG standard is used, non-locked encoder (frame and sampling rate) clock errors are recorded with time stamps and then included in the bit stream. During playback, in order to prevent an AV sync error, at least one decoder must have a PLL mechanism which uses time stamps regularly and make the actual frame (or sampling) rate match the time stamp values. The video decoder should thus read the video time stamps (i.e. the DTS—the Decoding Time Stamps) or the video PTS (the Presentation Time Stamps) and use these time stamps to control the picture rate, or the audio decoder should read the audio DTSs and use these to control the audio sampling rate, or both decoders should use time stamps to control their clocks.

In FIG. 1, an MPEG or similar data stream 20 of packets is shown as a mixture of video packets such as 22 and audio packets 24. Collections of packets 22 and 24 are arranged in a larger pack preceded by a pack header 26. In each case, the actual video data 27 or audio data 28 are preceded by a video packet header which contains (among other data items) time stamp 30 or an audio packet header which contains (among other data items) time stamps 32 respectively. The actual video data 27 are divided into video frames, whereas the audio data 28 are divided into batches of samples as illustrated.

According to one decoding method, the decoding system demultiplexes the incoming packets into an audio bit stream and a video bit stream, takes the time stamps from the packet header, and inserts them just before the related access unit in each elementary stream. This generates the syntax as shown in FIG. 2. In this syntax, for example, frame n+1 contains the value of the video time stamp (VTS) (i.e. a time value from a 90 KHz clock). Similarly, unit m+1 includes the audio time stamp (ATS) just prior to the audio unit m+1.

In order to produce such elementary streams, a decoding system as shown in FIG. 3 can be used. In this system, the multiplexed bit stream 20 is provided to a demultiplexer 50 which separates the bit stream into video data, video time stamps, audio data and audio time stamps. The video data are passed through a video syntax modifier 54 while the audio data are passed through an audio syntax modifier 58. The modified video and audio data are buffered in buffers 60 and 62 respectively prior to decoding by video and audio decoders 66 and 68 respectively under control of picture rate control circuit 74 and sample rate control 76. Video and audio emerge at the outputs 84 and 86 respectively.

This method has the drawback that extra modules are required before each buffer in order to insert the time stamps in the right place of the demultiplexed data streams. If the time stamps were in the correct layer, this problem would not exist.

Also, this non-locked system has a further drawback that both the elementary A/V bit streams are modified (i.e. the bit streams at the input of the decoders do not comply with the respective audio and video standards). Therefore, the decoders of this system cannot directly decode non-multiplexed audio and video bit streams.

Finally, this non-locked system succeeds in maintaining the relation between time stamps and access unit headers. Therefore, it has the ability to detect whether access unit headers are lost or falsely generated (e.g. due to a transmission error). Such an error would cause a large difference between the intended access unit decoding time (i.e. the time stamp's value) and the actual access unit's decoding time which would be detected by the affected decoder's PLL. However, unfortunately, the PLLs are designed to correct such differences by adjustments of the decoder's clock, which in the worst case will cause a third drawback. The PLL will try to repair such a large AV sync error by adjusting the decoder rate very slowly (as usual). Such a slow correction procedure requires a long time to repair the AV sync error and the corresponding buffer error. Consequently, the chance of buffer underflow or overflow increases. Also, since a large AV sync error could last for several seconds or longer, the chance that the user will notice the AV sync error increases. If the PLL attempts to repair the AV error by quickly adjusting the affected decoder's clock, other audio or video artifacts would be generated (e.g. vertical roll in the video or audio frequency shift in the audio). Therefore in this system the adjustment of a decoder clock with time stamp values is appropriate for replicating the small encoder clock errors that exist in nonlocked encoded composite bit streams. This approach is not always suitable for correcting large sync errors that were caused by a certain number of lost or excess access unit headers.

The present invention was developed to alleviate these problems of non-locked MPEG decoding systems and to overcome the disadvantage of simple locked (MPEG and non-MPEG) decoding systems as described above.

Also, the system just described has the drawback that both elementary A/V bit streams are modified (i.e. the bit streams at the input of the decoders do not comply with the respective audio and video standard). Therefore, the decoders in this system can not directly decode non-multiplexed audio and video bit streams.

The present invention was designed to alleviate several problems as described above. The simplest MPEG decoding system (as described above) and the simplest non-MPEG decoding systems are locked decoding systems (systems where the video decoder's picture rate and the audio decoder's sampling rate are locked to a single common clock). These systems have the drawback that they can not be used in applications that lose or falsely generate access unit headers (for example, due to transmission or storage errors).

The present invention overcomes these shortcomings by using an access unit count value in each elementary stream. With this value each decoder can detect missing or false access unit headers. The affected decoder can then request a system reset or try to "repair" the synchronization error by redecoding access units or by skipping access units. The decoder for such a system is easily implemented. In addition to this, access count makes a simpler non-locked decoding system possible without the disadvantages of the non-locked decoding system above.

SUMMARY OF THE INVENTION

It is an object of the present invention to provide an A/V decoding system which can detect missing or excess access unit headers.

It is another object to provide an A/V decoding system which can maintain synchronization in an unlocked system.

It is another object to provide an A/V decoding system which can play back edited multiplex and edited elementary bit streams.

It is an advantage that the present invention is simple to implement.

It is another advantage that the current invention solves the problem of determining which time stamp belongs to which access unit, by looking at the value of each time stamp and then associating it with a certain access unit.

These and other objects, advantages and features of the invention will become apparent to those skilled in the art upon consideration of the following description of the invention.

In one embodiment of the invention, a demultiplexer for a multiplexed audio video signal includes a clock which produces a time reference. A demultiplexing switch separates a composite data stream into audio sample batches, audio time stamps, video frames, and video time stamps, where the audio time stamps are fewer than or equal in number to the audio sample batches and where the video time stamps are fewer than or equal in number to the video frames. An audio phase-locked loop receives the audio time stamps and the time reference, and compares the time reference with the audio time stamps to produce an audio timing signal which associates one of the audio sample batches with each of the audio time stamps. An audio decoder receives the audio sample batches and the audio timing signal, and decodes the audio sample batches in synchronization with the audio timing signal. A video phase-locked loop receives the video time stamps and the time reference and compares the time reference with the video time stamps to produce a video timing signal which associates one of the video frames with each of the video time stamps. A video decoder receives the video frames and the video timing signal, and decodes the video frames in synchronization with the video timing signal.

A demultiplexer for an MPEG standard multiplexed audio video signal includes a 90 KHz clock producing a time reference indicative of an absolute time elapsed since a reference time. A demultiplexing switch separates a composite data stream into audio sample batches, audio time stamps, video frames, and video time stamps, where the audio time stamps are fewer than or equal in number to the audio sample batches and the video time stamps are fewer than or equal in number to the video frames. A video timestamp buffer receives the video timestamps from the demultiplexing switch and an audio timestamp buffer receives the audio timestamps from the demultiplexing switch. A video buffer receives the video frames from the demultiplexing switch, and an audio buffer receives the audio sample batches from the demultiplexing switch. An audio phase-locked loop receives the audio time stamps from the audio timestamp buffer and receives the time reference. The audio PLL compares the time reference with the audio time stamps to produce an audio timing signal which associates one of the audio sample batches with each of the audio time stamps. The audio phase-locked loop associates an audio time stamp with the audio sample batch which is decoded closest in time, as measured by the clock, to the value of the audio time stamp. An audio decoder receives the audio sample batches and the audio timing signal, and decodes the audio sample batches in synchronization with the audio timing signal. A video phase-locked loop receives the video time stamps from the video time stamp buffer and receives the time reference. The video PLL compares the time reference with the video time stamps to produce a video timing signal which associates one of the video frames with each of the video time stamps. The video phase-locked loop associates a video time stamp with the video frame which is decoded closest in time, as measured by the clock, to the value of the video time stamp.

A video decoder receives the video frames and the video timing signal, and decodes the video frames in synchronization with the video timing signal.

In another aspect of the invention, a decoder includes a clock producing a time reference. The composite data stream is separated into data units and data time stamps. The data time stamps are fewer than or equal in number to the data units. A phase-locked loop receives the time stamps and the time reference, and compares the time reference with the time stamps to produce a timing signal which associates one of the data units with each of the time stamps. The wherein the phase-locked loop associates a time stamp with the data unit which is decoded closest in time, as measured by the clock, to the value of the video time stamp. A decoder receives the data units and the audio timing signal, and decodes the units in synchronization with the timing signal.

In another aspect of the invention, a demultiplexer for a multiplexed audio video signal includes a demultiplexing switch for separating a composite data stream into audio sample batches, audio time stamps, video frames, and video time stamps. An audio phase-locked loop receives the audio time stamps, and produces an audio timing signal in synchronization with the audio time stamps. An audio decoder receives the audio sample batches and the audio timing signal, and decodes the audio sample batches in synchronization with the audio timing signal. The audio decoder extracts an access unit count from the audio sample batches and compares the access unit count with a stored access unit count to verify that the audio decoder is operating in proper synchronization. A video phase-locked loop receives the video time stamps, and produces a video timing signal in synchronization with the video time stamps. A video decoder receives the video frames and the video timing signal, and decodes the video frames in synchronization with the video timing signal. The video decoder extracts an access unit count from the video frames and comparing the access unit count with a stored access unit count to verify that the video decoder is operating in proper synchronization.

In another aspect of the invention, a decoder includes a demultiplexing circuit for separating a composite data stream into data units and data time stamps. A timing circuit receives the data time stamps, and produces a timing signal in synchronization with the time stamps. A decoder receives the data units and the timing signal, and decodes the data units in synchronization with the timing signal. The decoder includes a circuit for extracting an access unit count from the each data unit and compares the access unit count with a stored access unit count to verify that the decoder is operating in proper synchronization.

A method for demultiplexing a multiplexed audio video signal according to the present invention includes the steps of: separating a composite data stream into audio sample batches, audio time stamps, video frames, and video time stamps; producing an audio timing signal in synchronization with the audio time stamps; decoding the audio sample batches in synchronization with the audio-timing signal; extracting an access unit count from the audio sample batches and comparing the access unit count with a stored access unit count to verify audio synchronization; producing a video timing signal in synchronization with the video time stamps; decoding the video frames in synchronization with the video timing signal; extracting an access unit count from the video frames and comparing the access unit count with a stored access unit count to verify video synchronization; incrementing the stored access unit count each time a new access unit is received.

Another method for processing a video and an associated audio signal according to the invention includes the steps of: providing a signal having audio sample batches and video frames; decoding the audio sample batches; extracting an access unit count from the audio sample batches and comparing the access unit count with a stored access unit count to verify audio synchronization; decoding the video frames; extracting an access unit count from the video frames and comparing the access unit count with a stored access unit count to verify video synchronization; incrementing the stored access unit count each time a new access unit is received.

Another method of the invention for processing a stream of data bits includes the steps of: initializing a register with an access unit count corresponding to a first frame header; receiving and decoding one or more subsequent frames; incrementing the register for each the subsequent frame and comparing the content of the register with an access unit count with each the subsequent frame; determining if the access unit count from each the subsequent frame is the same as that stored in the register to verify synchronization; omitting a video frame if said access unit count for said video frame is smaller than said stored access unit count; omitting an audio sample batch if said access unit count for said audio sample batch is smaller than said stored access unit count; detecting a discontinuity bit; reinitializing the register upon detection of the discontinuity bit.

According to ISO's MPEG 1 system standard (which is intended for digital AV storage media applications or digital AV transmission applications) in order to detect and correct AV synchronization errors at the decoder, "time stamps" are included in the packet headers of the multiplex syntax. A time stamp indicates the presentation time of the first access unit header (i.e. frame header or audio unit header) that occurs in that packet. After demultiplexing time stamps are normally separated from their related access units. This makes them difficult to use. In, for example, non-locked decoding systems, some method must be used to find out which time stamps belong to which access units. With one embodiment of the current invention, a relatively simple decoding system makes use of the redundancy of the time stamp values to determine this relationship. The current invention solves the problem of determining which time stamps belong to which access unit, by looking at the value of each time stamp and then associating it with a certain access unit. This enables easy non-locked decoding.

A compressed video signal and a compressed audio signal decoding apparatus of an embodiment of the invention includes a local access unit counter intended for digital AV applications where access unit headers (e.g., frame headers, audio unit headers or other kind of data unit headers) may be lost or generated by storage media or transmission errors. In order to prevent a resulting AV sync error, a value called "access unit count" is included in each elementary stream. With this value each decoder can detect lost or false access unit headers, and correct the AV synchronization. In order to support editing, an extra bit can be added to indicate discontinuity.

In embodiments where the access unit count fields are included in the syntax of each elementary bit stream by each encoder, there is no need to move this data from the multiplex layer to each elementary in the decoding system. Therefore the decoding system's hardware or software complexity is low. In this, decoding system time stamps are used for the initial start up delay and synchronization, and also to follow the encoder's frame and/or audio sampling rate clock error. Access Unit Count is used only to detect missing or fake access unit headers. Also easier MPEG locked decoder systems are possible, and the invention can be used in non-MPEG applications.

The features of the invention believed to be novel are set forth with particularity in the appended claims. The invention itself however, both as to organization and method of operation, together with further objects and advantages thereof, may be best understood by reference to the following description taken in conjunction with the accompanying drawing.

BRIEF DESCRIPTION OF THE DRAWING

FIG. 9 illustrates bitstream editing.

DETAILED DESCRIPTION OF THE INVENTION

Figure 1:
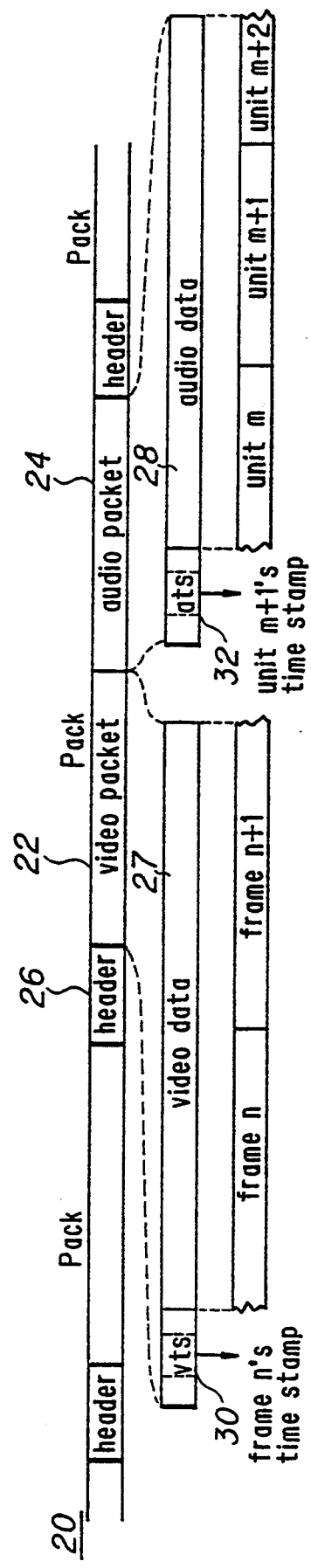
FIG. 1 is a diagram of an MPEG data stream.
Figure 2:
FIG. 2 is a diagram of a decoded MPEG data stream using one type of decoder.
Figure 3:
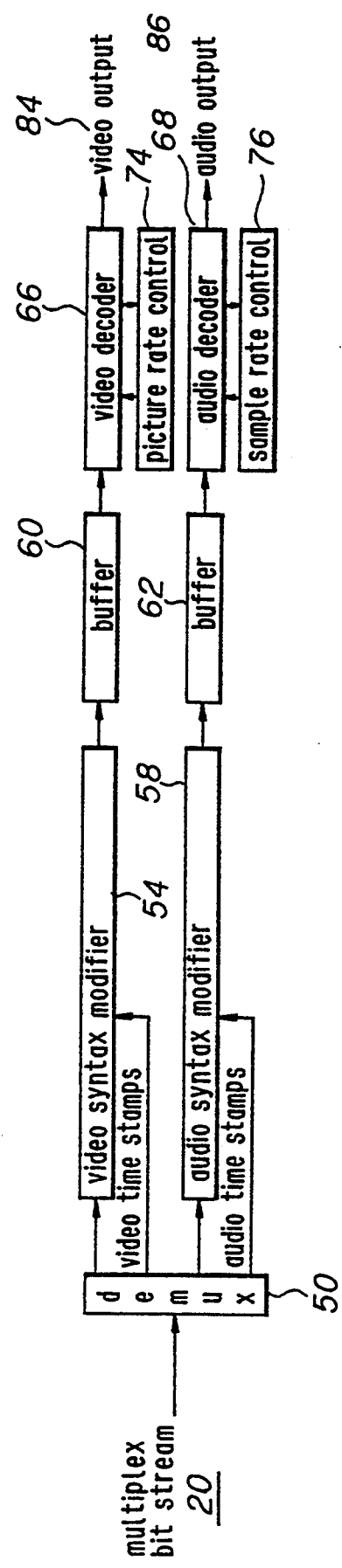
FIG. 3 is a block diagram of a system producing the data stream of FIG. 2.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. For example, the present invention can also be used with CD ROM and Interactive CD applications. Also, although the embodiments shown are for MPEG type multiplexed systems, the invention can be used with similar systems.

A partial solution to some of the problems described above is described in connection with FIGS. 4 and 5. This solution may be adequate for some systems or with systems requiring strict conformity with the MPEG 1 standard. In this system, a relatively simple decoding system makes use of redundancy of the time stamp values to determine the relationship between the time stamp and the access unit associated therewith. In non-locked encoded bit streams, e.g. the video time stamps indicate the decoding time for their respective pictures, which depends on the video encoder's picture rate (e.g. 30 Hz) and the video encoder's clock error. In this kind of bit stream, if the video encoder's picture rate clock error is 0 and if a perfect 90 KHz clock is used by the encoding system, the difference between consecutive time stamps is n*3000 where n is an integer larger or equal to 1. (3000 is the number of 90 KHz cycles in each picture period, if the picture rate is exactly 30 Hz).

Figure 4:
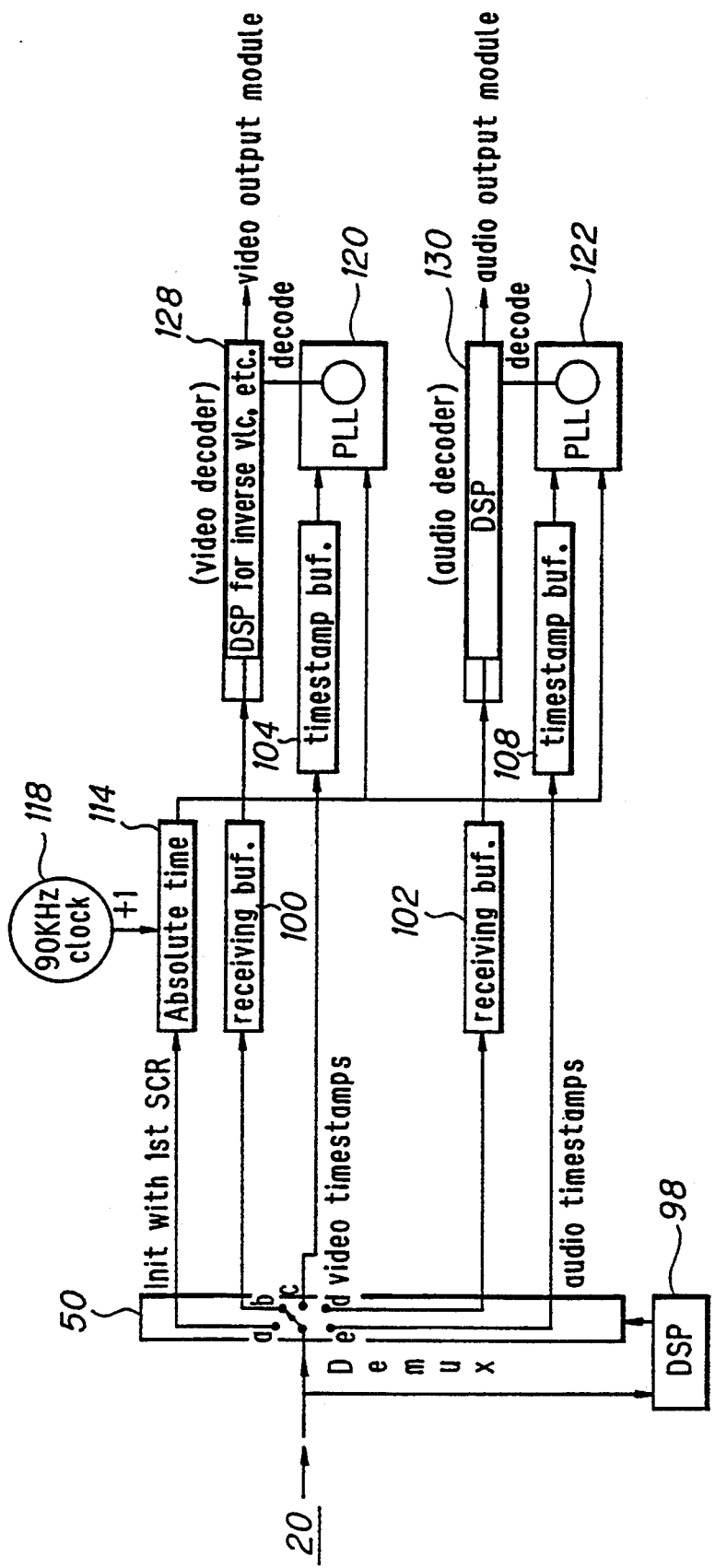
FIG. 4 shows a diagram of an unlocked decoder system of a related invention.

However with the clock errors, this difference can be, e.g. n*3000 +1 or −1. (The MPEG standard specifies a limit on the encoder clock errors (<100ppm), and a limit on the interval between two consecutive time stamps (<0.8s)). Consequently, by looking at the value of each time stamp, and by counting the number of processed pictures, (a module of) the video decoder can find out which time stamp belongs to which picture and then use the time stamps to control the picture rate. A similar method can also be applied for the audio decoder if necessary. A decoder according to this partial solution is illustrated in FIG. 4. In this decoder, a multiplexed bit stream 20 passes through a demultiplexer 50, which, operating under control of a digital signal processor (DSP) 98, separates out video data and sends it to video receive buffer 100. Audio data are sent to audio receive buffer 102. Video time stamps are sent to video time stamp buffer 104 while audio time stamps are sent to audio time stamp buffer 108.

In this system, each PLL relates timestamps to a particular access unit. That is, each PLL 120 and 122 associates a time stamp with the access unit which is decoded nearest the timestamp value. The time stamp is then used to control the clocking of the audio or video decoder.

For initialization, the SCR from the first pack header is passed to an absolute time correction register 114 which is driven by a clock 118 (90 KHz in the case of MPEG 1). This absolute time value is used to drive a video phase-locked loop (PLL) 120 and an audio PLL 122. Video and audio PLLs 120 and 122 respectively time video and audio decoders 128 and 130 which respectively receive the video and audio data from the video buffer 100 and audio buffer 102.

Figure 5:
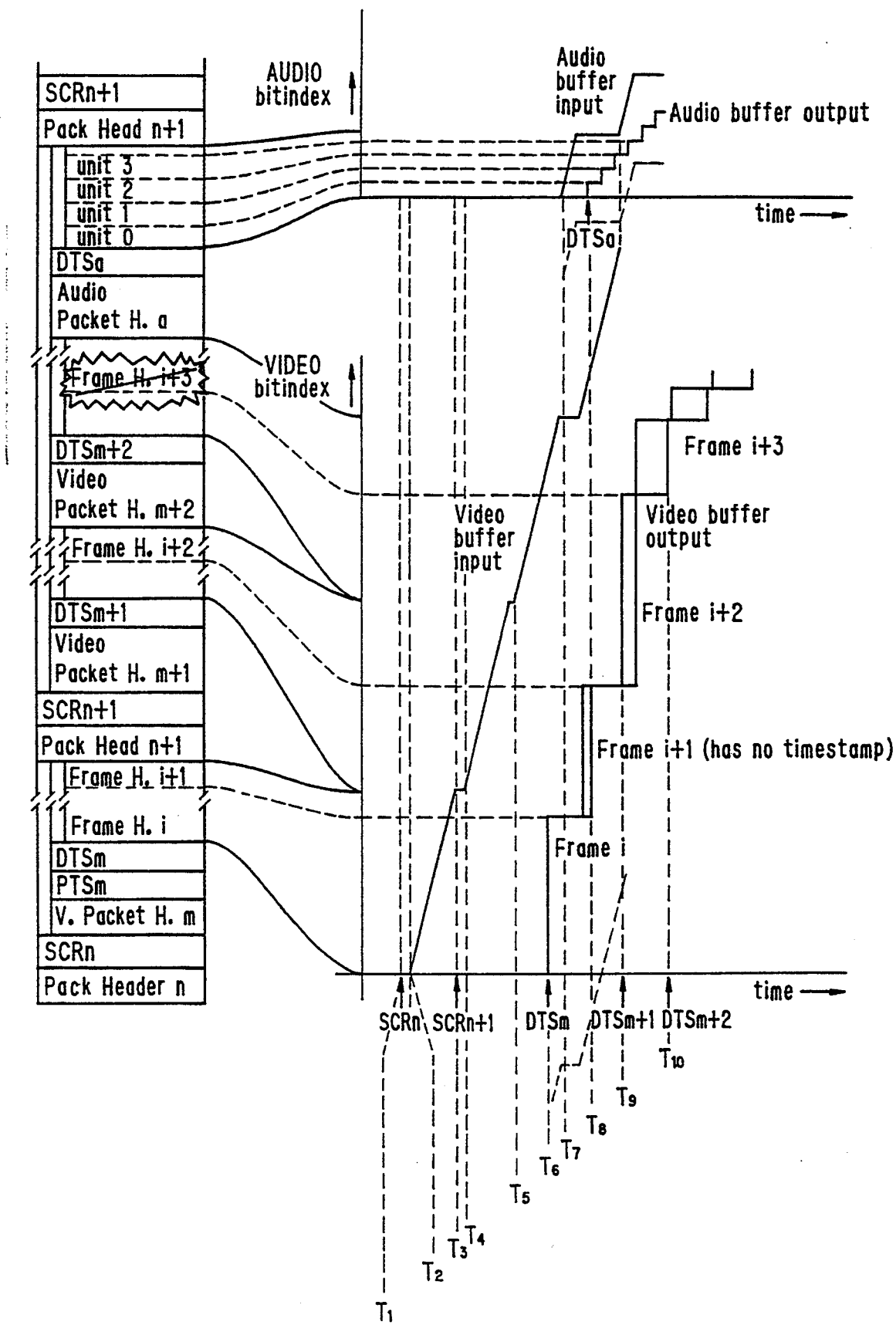
FIG. 5 shows a timing diagram of the operation of the unlocked decoder of FIG. 4.

Operation of this decoder system is illustrated in FIG. 5. At time T1 DSP 98 detects the first pack header, turns demultiplexer 50 to position "a", and initializes register 114 with SCRn. From here on, register 114's content is incremented by one by the 90 KHz clock 118. At time T2, DSP 98 detects the first video packet (ignores PTS) and turns demultiplexer 50 to position "c". DTSm is stored in timestamp buffer 104. (When the next pack header is detected at time T3, the difference between SCRn+1 and 114's contents can be used to control the DSM bit rate.)

At time T4, DSP 98 detects a video packet and turns demultiplexer 50 to "c" diverting the time stamp (DTS) to the timestamp buffer 104. DTSm+1 is stored in timestamp buffer 104 and demultiplexer 50 is set to "b" to route the video data to buffer 100. At time T5, DSP 98 sets demultiplexer 50 to "c", and the next time stamp DTSm+2 is stored in timestamp buffer 104. Then demultiplexer 50 is then set to position "b" to again route data to buffer 100.

At time T6, register 114's contents becomes the same as the first timestamp in buffer 104. PLL 120 detects this condition and starts decoder 128. At time T7, DSP 98 detects an audio packet, so it sets demultiplexer 50 to position "e" sending the time stamp to buffer 108. DTSa is thus stored in buffer 108. At time T8, Register 114's contents becomes the same as DTSa (in 108). PLL 122 detects this and starts decoder 130. PLL 120 looks at the next timestamp (DTSm+1), knows that this frame has no time stamp. At time T9, PLL 120 detects the relation between DTSm+1 and frame i+2 and tries to speed up the PLL clock 120.

This method works well if the transmission (or DSM) error characteristics are limited. However, if, e.g., a transmission error destroys an access unit header (e.g. the frame header i+3 as illustrated in FIG. 5), the decoding system would not have a reliable way to detect the missing frame header. In this example, at time T9 the decoder fails to detect the damaged frame header i+3 and simply discards all following data until the next frame header i+4. At T10, the decoder processes frame i+4 one picture period too early, which causes an AV sync error that is approximately equal to one picture period. Also at T10, PLL 120 relates time stamp DTSm+2 to the frame that is decoded near the time DTSm+2, which due to the transmission error, is frame i+4. Therefore, again PLL 120 assumes that the frame rate is too slow and will try to speed up the frame rate clock 120. However, due to the damaged frame header 1+3, the frame rate is actually too fast.

(Note: the existing temporal reference field in each frame header of the MPEG video syntax does provide some opportunity to detect missing or excess frame headers, but unfortunately this value is reset to zero at the first frame of each Group Of Pictures (GOP). Consequently, the last frame of each GOP is not protected, and a video bitstream where each GOP has only one frame (e.g. all temporal_references zero) would be offered no protection at all. Another option might be to use the existing time_code in GOP header of the MPEG video syntax. However, this has the drawback that error detection can only be performed when receiving GOP headers, so that, in case of GOP's with many frames, the sync error and buffer error would last for a long time. Furthermore, the chances of buffer overflow or underflow increase if the sync error is not corrected soon after it occurs. In any case, the MPEG audio standard is not believed to have any data item that can be used to detect missing or excess audio access unit headers.)

FIGS. 4 and 5 show an example of a non-locked MPEG decoding system. In this system the timestamps can only be used for small adjustments of the frame and sampling rate clock. The effect of a transmission (or DSM) error which destroys an access unit header (in this case frame header i+3) is presented. Note that besides the AV sync error, also a large video buffer error is generated. Therefore in some cases, such a transmission error can also cause buffer overflow or underflow. If this kind of transmission error occurs in a locked decoding system, the same kind of problems (AV sync error and buffer error) are caused.

This kind of decoding system cannot detect whether access units headers are lost or falsely generated (e.g., due to transmission errors). Therefore, the application of this invention may be primarily in systems that have limited transmission error characteristics or requirements. To alleviate the above shortcoming (which also occurs in non MPEG applications) the following method can be used.

Figure 6:
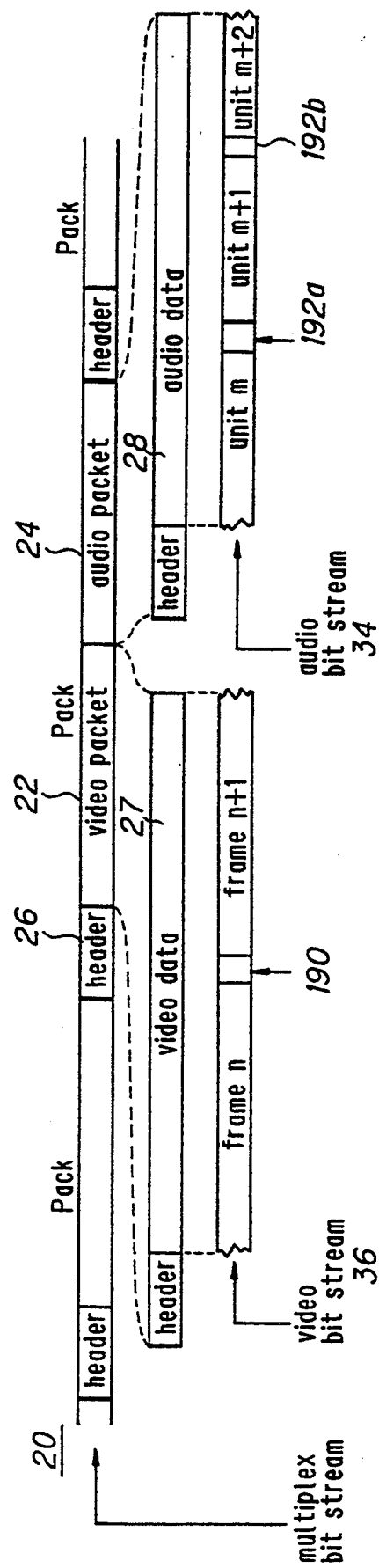
FIG. 6 shows a diagram of a data stream incorporating the access unit counts of the present invention.

Turning now to FIG. 6, a data stream which is modified to include access unit counts according to the present invention is shown. In this data stream, video data 27 are arranged in frames shown as n, n+1, etc. According to the present invention, each frame of video includes an access unit count 190 which precedes the frame. Access unit count 190 is assigned the value n+1 for the frame shown. Similarly, each audio unit of audio data 28 includes an access unit count 192, shown as 192a and 192b. The value assigned to access unit count 192a is m+1 while the value assigned to access unit count 192b is m+2. Other arrangements for assignment of access unit count may also be used without departing from the present invention.

Figure 7:
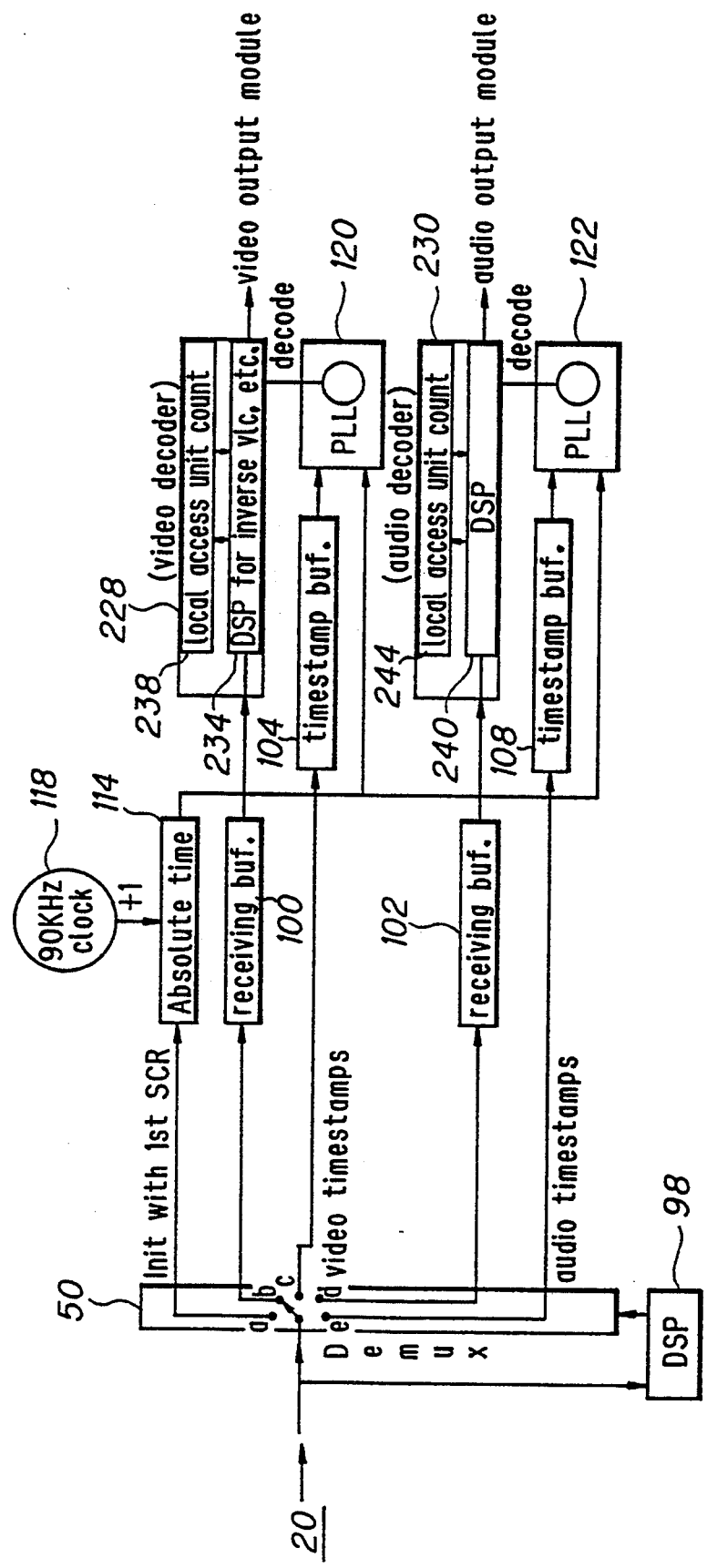
FIG. 7 is a block diagram of a decoder system for the data stream of FIG. 6.

Referring to FIG. 7, a decoder for the data stream of FIG. 6 is shown. In this decoder the multiplexed bit stream 20 passes through a demultiplexer 50, operating under control of a digital signal processor (DSP) 98, which separates out video data and sends it to video receive buffer 100. Audio data are sent to audio receive buffer 102. Time stamps are sent to video time stamp buffer 104 while audio time stamps are sent to audio time stamp buffer 108.

Some systems may not use all time stamps because this might require a relatively large and expensive time stamp buffer 104. A small time stamp buffer is preferable which can hold only one time stamp at a time. Whenever this time stamp buffer is full, incoming time stamps are discarded. This has the advantage of simplified buffer management since there is no need for read or write pointers to the time stamp buffer. The disadvantage is that PLL control is somewhat slower. Note, however, that time stamps are only used to replicate small encoder clock errors. Therefore, some additional deviation from the decoding time (as specified by time stamps) will only cause very small additional AV sync error and very small additional buffer error. When conventional crystals are used to drive the decoder clocks, even a delay of a clock control action of a few seconds would produce at most an additional AV sync error of a few 90 KHz clock cycles. Thus, since these errors are far below the half picture period sync error (in the case of 30 Hz, 1500 90 KHz clock cycles) it is still easy to associate time stamps with their related access units.

As with the system of FIG. 4, for initialization, the SCR from the first packet header is passed to an absolute time correction circuit 114 which is driven by a clock 118 (90 KHz in the case of MPEG 1). This absolute time is used to drive a video phase-locked loop (PLL) 120 and an audio PLL 122. Video and audio PLLs 120 and 122 respectively time video an audio decoders 228 and 230, which respectively receive the video and audio data from the video buffer 100 and audio buffer 102.

Video decoder 228 includes a video DSP 234 which (after start-up) extracts the first read (first encountered) access unit count from the video bitstream and stores it in a register 238 as a local access unit count. Similarly, audio decoder 230 includes a DSP 240 which extracts the first read access unit count from the audio bitstream and stores it in a register 244 as a local access unit count.

Figure 8:
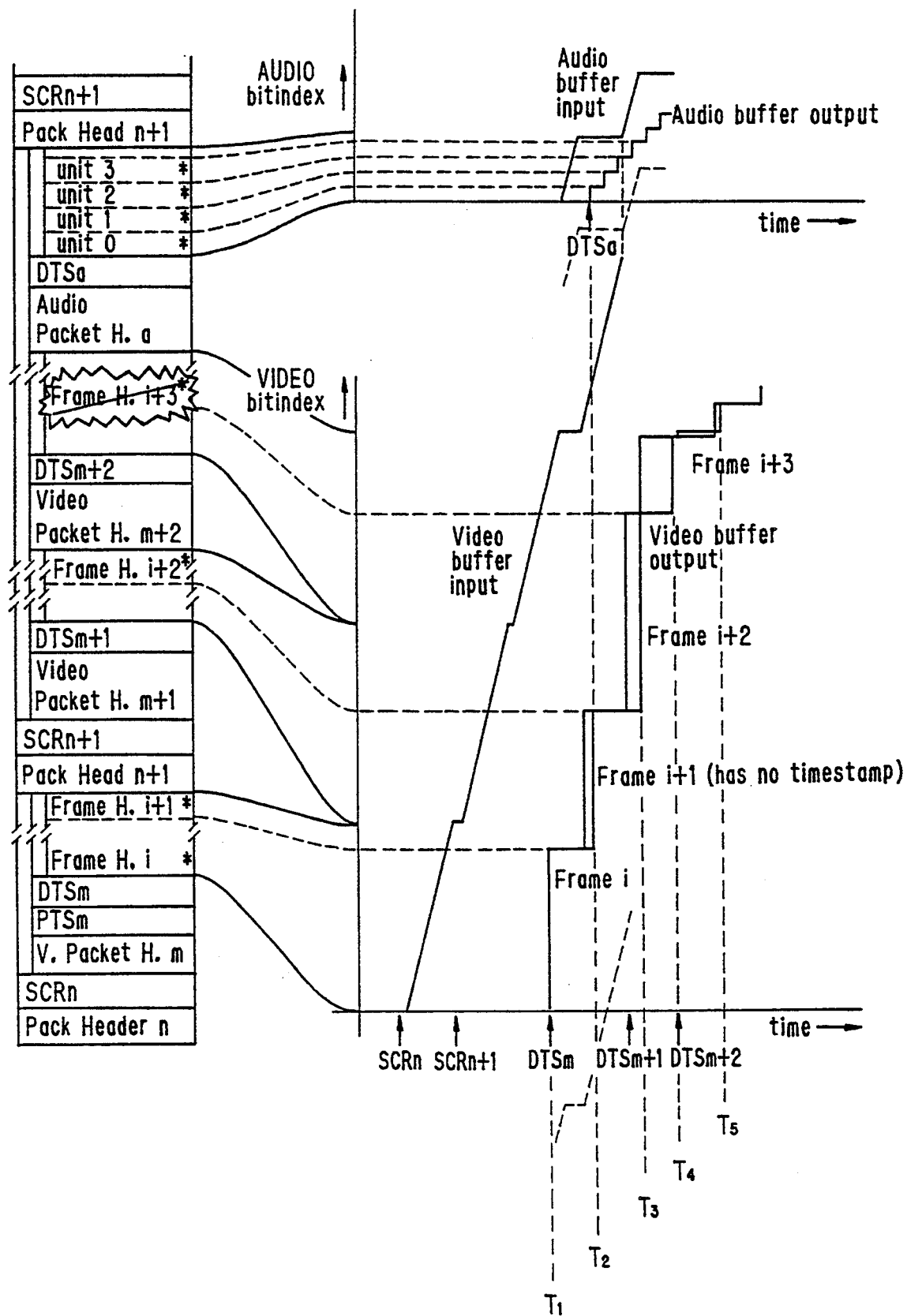
FIG. 8 is a timing diagram illustrating operation of the embodiment of FIG. 7.

The operation of this embodiment can be better understood with reference to the timing diagram of FIG. 8. At time T1, decoder 228 starts. DSP 234 initializes register 238 with the value i (which represents the access unit count from the first frame header). At time T2, DSP 234 decodes, the next frame, increments register 238 and compares it with current access unit count (i.e., from the currently processed frame). DSP 234 verifies that the access unit count is the same as that stored locally, thus the system is in synchronization.

At time T3, DSP 234 increments register 238, compares its value with the current access unit count (i+2) and determines that the result is proper. At time T4, DSP 234 increments register 238, compares its value (i+3) with access unit count (i+4), and thus detects that an error has occurred. Decoding of frame i+4 is postponed and the current displayed frame is redisplayed. At time T5, DSP 234 resumes decoding of frame i+4, the AV sync error is corrected.

If the bitstream as illustrated in FIG. 8 had not been corrupted due to the transmission error, it would have complied with all three parts of the MPEG standard. However, since a frame header was destroyed, part of the video and part of the multiplex bitstreams are non-compliant. The received video bitstream is non-compliant because there is an amount of non-decodable data following frame i+2, and because the frame i+3 is missing. The multiplex stream is non-compliant because the third video packet has a time stamp, but does not contain a detectable frame header. According to the systems standard, packets that do not have an access unit header, never have time stamps. The output of the encoding system, however, is a legal bit stream.

This example shows how the AV sync error is detected, and then corrected. In this example, the missing picture error is corrected immediately, that is, after one picture period. However a more intelligent video decoder may decide to postpone the correction procedure until (for example) a still (or hardly moving) picture sequence occurs. This might produce more realistic video output. The same can also be done in case of audio. Skipping or copying audio access units may sound better during a quiet part of the audio track.

In order to continue playback, despite missing/additional access units, the buffers should be made larger (than for non-error systems). This prevents underflow, and (depending on the application) overflow. The problem of missing access units will most likely occur, for example, in applications where there is a high transmission rate error and a very low video bit rate. In this case there is a high chance that the error hits a frame header.

If desired or necessary a "discontinuity bit" can be attached to the Access Unit Count field in order to enable playback of edited bitstreams. FIG. 9 shows an example of how a bit stream is edited. In this case the editor decides to remove one frame. Thus, the frames would not have sequential access unit counts. The decoding system operates as described in FIG. 8, but it re-initializes the local access unit counter every time when the "discontinuity bit" is set. The drawback of using this "discontinuity bit" is that missing/additional access units can not be detected if they occur at edited points in the bitstream. (In other words "discontinuity bit"=1 disables the decoding system's "access unit count" checking mechanism for 1 access unit period).

Thus it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A demultiplexer for a multiplexed audio video signal, the demultiplexer comprising:
    a clock producing a time reference;
    a demultiplexing switch for separating a composite data stream into audio sample batches, audio time stamps, video frames, and video time stamps, wherein the audio time stamps are fewer or equal in number than the audio sample batches and wherein the video time stamps are fewer or equal in number than the video frames;
    an audio phase-locked loop, receiving the audio time stamps and the time reference, for comparing the time reference with the audio time stamps to produce an audio timing signal and to associate one of the audio sample batches with each of the audio time stamps;
    an audio decoder receiving the audio sample batches and the audio timing signal, and for decoding the audio sample batches in synchronization with the audio timing signal;
    a video phase-locked loop, receiving the video time stamps and the time reference, for comparing the time reference with the video time stamps to produce a video timing signal and to associate one of the video frames with each of the video time stamps; and
    a video decoder receiving the video frames and the video timing signal, and for decoding the video frames in synchronization with the video timing signal.

2. The demultiplexer of claim 1, further comprising a video time stamp buffer receiving the video time stamps from the demultiplexing switch.

3. The demultiplexer of claim 1, further comprising an audio time stamp buffer receiving the audio time stamps from the demultiplexing switch.

4. The demultiplexer of claim 1, further comprising a video buffer receiving the video frames from the demultiplexing switch.

5. The demultiplexer of claim 1, further comprising an audio buffer receiving the audio sample batches from the demultiplexing switch.

6. The demultiplexer of claim 1, wherein the time reference is indicative of an absolute time elapsed since a reference time.

7. The demultiplexer of claim 1, wherein the clock operates at 90 kHz.

8. The demultiplexer of claim 1, wherein the multiplexed audio video signal is an MPEG standard signal.

9. The demultiplexer of claim 6, wherein the one of the audio sample batches associated by the audio phase-locked loop with each of the audio time stamps is the one of the audio sample batches that, absent the audio time stamp, would be decoded closest in time, as measured by the clock, to the value of the audio time stamp.

10. The demultiplexer of claim 6, wherein the one of the video frames associated by the video phase-locked loop each of the video time stamps is the one of the video frames that, absent the video time stamp, would be decoded closest in time, as measured by the clock, to the value of the video time stamp.

11. A demultiplexer for an MPEG standard multiplexed audio video signal, the demultiplexer comprising:
    a 90 kHz clock producing a time reference indicative of an absolute time elapsed since a reference time;
    a demultiplexing switch for separating a composite data stream into audio sample batches, audio time stamps, video frames, and video time stamps, wherein the audio time stamps are fewer or equal in number than the audio sample batches and the video time stamps are fewer or equal in number than the video frames;
    a video timestamp buffer receiving the video timestamps from the demultiplexing switch;

an audio timestamp buffer receiving the audio time stamps from the demultiplexing switch;

a video buffer receiving the video frames from the demultiplexing switch;

an audio buffer receiving the audio sample batches from the demultiplexing switch;

an audio phase-locked loop, receiving the audio time stamps from the audio timestamp buffer and receiving the time reference, for comparing the time reference with the audio time stamps to produce an audio timing signal and to associate one of the audio sample batches with each of the audio time stamps, the one of the audio sample batches associated by the audio phase-locked loop with each of the audio time stamps being the one of the audio sample batches that, absent the audio time stamp, would be decoded closest in time, as measured by the clock, to the value of the audio time stamp;

an audio decoder receiving the audio sample batches and the audio timing signal, and for decoding the audio sample batches in synchronization with the audio timing signal;

a video phase-locked loop, receiving the video time stamps from the video time stamp buffer and receiving the time reference, for comparing the time reference with the video time stamps to produce a video timing signal and to associate one of the video frames with each of the video time stamps, the one of the video frames associated by the video phase-locked loop with each of the video time stamps being the one of the video frames that, absent the video time stamp would be decoded closest in time, as measured by the clock, to the value of the video time stamp; and a video decoder receiving the video frames and the video timing signal, and for decoding the video frames in synchronization with the video timing signal.

12. A decoder, comprising:

a clock producing a time reference;

means for separating a composite data stream into data units and data time stamps, wherein the data time stamps are fewer or equal in number than the data units;

a phase-locked loop, receiving the time stamps and the time reference, for comparing the time reference with the time stamps to produce a timing signal and to associate one of the data units with each of the data time stamps, the one of the data units associated by the phase-locked loop with each of the data time stamps being the one of the data units that, absent the data time stamp, would be decoded closest in time, as measured by the clock, to the value of the data time stamp; and a data decoder receiving the data units and the timing signal, and for decoding the data units in synchronization with the timing signal.

13. A demultiplexer for a multiplexed audio video signal, the demultiplexer comprising:

a demultiplexing switch for separating a composite data stream into audio sample batches, audio time stamps, video frames, and video time stamps;

an audio phase-locked loop, receiving the audio time stamps, for producing an audio timing signal in synchronization with the audio time stamps;

an audio decoder receiving the audio sample batches and the audio timing signal, and for decoding the audio sample batches in synchronization with the audio timing signal;

the audio decoder including means for extracting an access unit count from the audio sample batches and comparing the access unit count with a stored access unit count to verify that the audio decoder is operating in proper synchronization;

a video phase-locked loop, receiving the video time stamps, for producing a video timing signal in synchronization with the video time stamps;

a video decoder receiving the video frames and the video timing signal, and for decoding the video frames in synchronization with the video timing signal; and the video decoder including means for extracting an access unit count from the video frames and comparing the access unit count with a stored access unit count to verify that the video decoder is operating in proper synchronization.

14. The demultiplexer of claim 13, further comprising a video timestamp buffer receiving the video timestamps from the demultiplexing switch.

15. The demultiplexer of claim 13, further comprising an audio timestamp buffer receiving the audio timestamps from the demultiplexing switch.

16. The demultiplexer of claim 13, further comprising a video buffer receiving the video frames from the demultiplexing switch.

17. The demultiplexer of claim 13, further comprising an audio buffer receiving the audio sample batches from the demultiplexing switch.

18. A decoder, comprising:

means for separating a composite data stream into data units and data time stamps;

timing means receiving the data time stamps, for producing a timing signal in synchronization with the data time stamps; and a data decoder receiving the data units and the timing signal, for decoding the data units in synchronization with the timing signal;

the data decoder including means for extracting an access unit count from each of the data units and comparing the access unit count with a stored access unit count to verify that the data decoder is operating in proper synchronization.

19. The decoder of claim 18, wherein the timing means includes a phase-locked loop.

20. A method for demultiplexing a multiplexed audio video signal, the method comprising the steps of:

separating a composite data stream into audio sample batches, audio time stamps, video frames, and video time stamps;

producing an audio timing signal in synchronization with the audio time stamps;

decoding the audio sample batches in synchronization with the audio timing signal;

extracting an audio access unit count from the audio sample batches and comparing the audio access unit count with a stored audio access unit count to verify audio synchronization;

producing a video timing signal in synchronization with the video time stamps;

decoding the video frames in synchronization with the video timing signal;

extracting a video access unit count from the video frames and comparing the video access unit count with a stored video access unit count to verify video synchronization; and incrementing the stored audio access unit count each time an audio sample batch is decoded, and incrementing the stored video access unit each time a video frame is decoded.

21. The method of claim 20, further comprising the step of duplicating a video frame if the video access unit count for the video frame is larger than the stored video access unit count.

22. The method of claim 20, further comprising the step of omitting a video frame if the video access unit count for the video frame is smaller than the stored video access unit count.

23. 3The method of claim 20, further comprising the step of omitting an audio sample batch if the audio access unit count for the audio sample batch is smaller than the stored audio access unit count.

24. The method of claim 20, further comprising the step of duplicating an audio sample batch if the audio access unit count for the audio sample batch is larger than the stored audio access unit count.

25. A method for processing a video and an associated audio signal, the method comprising the steps of:
providing a signal including audio sample batches and video frames;
decoding the audio sample batches;
extracting an audio access unit count from the audio sample batches and comparing the audio access unit count with a stored audio access unit count to verify audio synchronization;
decoding the video frames;
extracting a video access unit count from the video frames and comparing the video access unit count with a stored video access unit count to verify video synchronization; and
incrementing the stored audio access unit count each time an audio sample batch is decoded, and incrementing the stored video access unit count each time a video frame is decoded.

26. The method of claim 25, further comprising the step of duplicating a video frame if the video access unit count for the video frame is larger than the stored video access unit count.

27. The method of claim 25, further comprising the step of omitting a video frame if the video access unit count for the video frame is smaller than the stored video access unit count.

28. The method of claim 25, further comprising the step of omitting an audio sample batch if the audio access unit count for the audio sample batch is smaller than the stored audio access unit count.

29. The method of claim 25, further comprising the step of duplicating an audio sample batch if the audio access unit count for the audio sample batch is larger than the stored audio access unit count.

30. The method of claim 25, wherein the audio video signal includes additional audio and video time stamps respectively indicating presentation times for ones of the audio sample batches and video frames.

31. A method for processing a stream of data bits divided into access units, the method comprising the steps of:
receiving a first access unit;
initializing a register with an access unit count corresponding to the first access unit;
receiving and decoding one or more subsequent access units following the first access unit;
incrementing the access unit count stored in the register for each of the subsequent access units and comparing the access unit count stored in the register with an access unit count extracted from each of the subsequent access units;
determining if the access unit count extracted from each of the subsequent access units is the same as the access unit count stored in the register to verify synchronization;
omitting one of the subsequent access units if the access unit count extracted from said one of the subsequent access units is smaller than the access unit count stored in the register;
detecting a discontinuity bit in the stream of data bits; and
reinitializing the register upon detection of the discontinuity bit.

32. The method of claim 31, wherein the register is reinitialized with an access unit count extracted from an access unit following the discontinuity bit.

* * * * *